United States Patent
Tokuyama (12)
(10) Patent No.: US 6,232,745 B1
(45) Date of Patent: May 15, 2001

(54) CHARGING CONTROLLER

(75) Inventor: Hiroshi Tokuyama, Kyoto (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/568,720

(22) Filed: May 11, 2000

(30) Foreign Application Priority Data

May 14, 1999 (JP) ................................................. 11-134714

(51) Int. Cl.[7] ....................................................... H02J 7/00
(52) U.S. Cl. ........................... 320/132; 320/160; 320/162
(58) Field of Search ..................................... 320/132, 134, 320/136, 162, 160; 324/426

(56) References Cited

U.S. PATENT DOCUMENTS

| | | | |
|---|---|---|---|
| 5,254,951 | * 10/1993 | Goto et al. | 324/426 |
| 5,723,970 | 3/1998 | Bell . | |
| 5,963,015 | * 10/1999 | Lee | 320/128 |

FOREIGN PATENT DOCUMENTS

| | | | |
|---|---|---|---|
| 5137276 | 12/1991 | (JP) . | |
| 5-137276 | * 6/1993 | (JP) | 320/136 |

* cited by examiner

*Primary Examiner*—Peter S. Wong
*Assistant Examiner*—Gregory J Toatley, Jr.
(74) *Attorney, Agent, or Firm*—Ostrolenk, Faber, Gerb & Soffen, LLP (57) ABSTRACT

A charging controller for charging a secondary battery by a dc source has a consumption current detector for detecting a consumption current flowing in a load, a charging control circuit controlling charging of the secondary battery; a charging circuit input current detector detecting a current to be input to the charging controller; and an operation processor to which detection outputs from the consumption current detector and the charging circuit input current detector are provided, respectively, the charging control circuit controlling the charging output to the secondary battery, based on calculation results obtained by the operation processor such that driving the load and charging are simultaneously executed within the ratings of the dc source.

8 Claims, 6 Drawing Sheets

CHARGING CONTROLLER

BACKGROUND OF THE INVENTION

1. Cross Reference to Related Application

This application is one of four related applications, attorney reference numbers: 1071-1011, 1071-1012, 1071-1013 and 1071-1016.

2. Field of the Invention

The present invention relates to a charging controller, and more particularly to a charging controller for charging a secondary battery used in a portable electronic device, for example.

3. Description of the Related Art Portable electronic devices such as a notebook-sized computer, and so forth contain a secondary battery. As to a charging controller for driving a unit and charging the secondary battery simultaneously, the following techniques have been disclosed.

According to a first technique, the rating of output power from a dc source is designed so as to be not less than the sum of the maximum consumption power of a unit and maximum charging power.

According to a second technique, as described in Japanese Unexamined Patent Publication No. 5-137276, only a unit load current is detected, the difference between the rated current of a dc source and the unit load current is determined, and a charging output is controlled so that the charging current is equal to the difference.

According to a third technique, as described in U.S. Pat. No. 5,723,970, an output current from a dc source is detected, and a charging output is controlled so that the output current from the dc source is prevented from exceeding the rated current.

Figure 3:
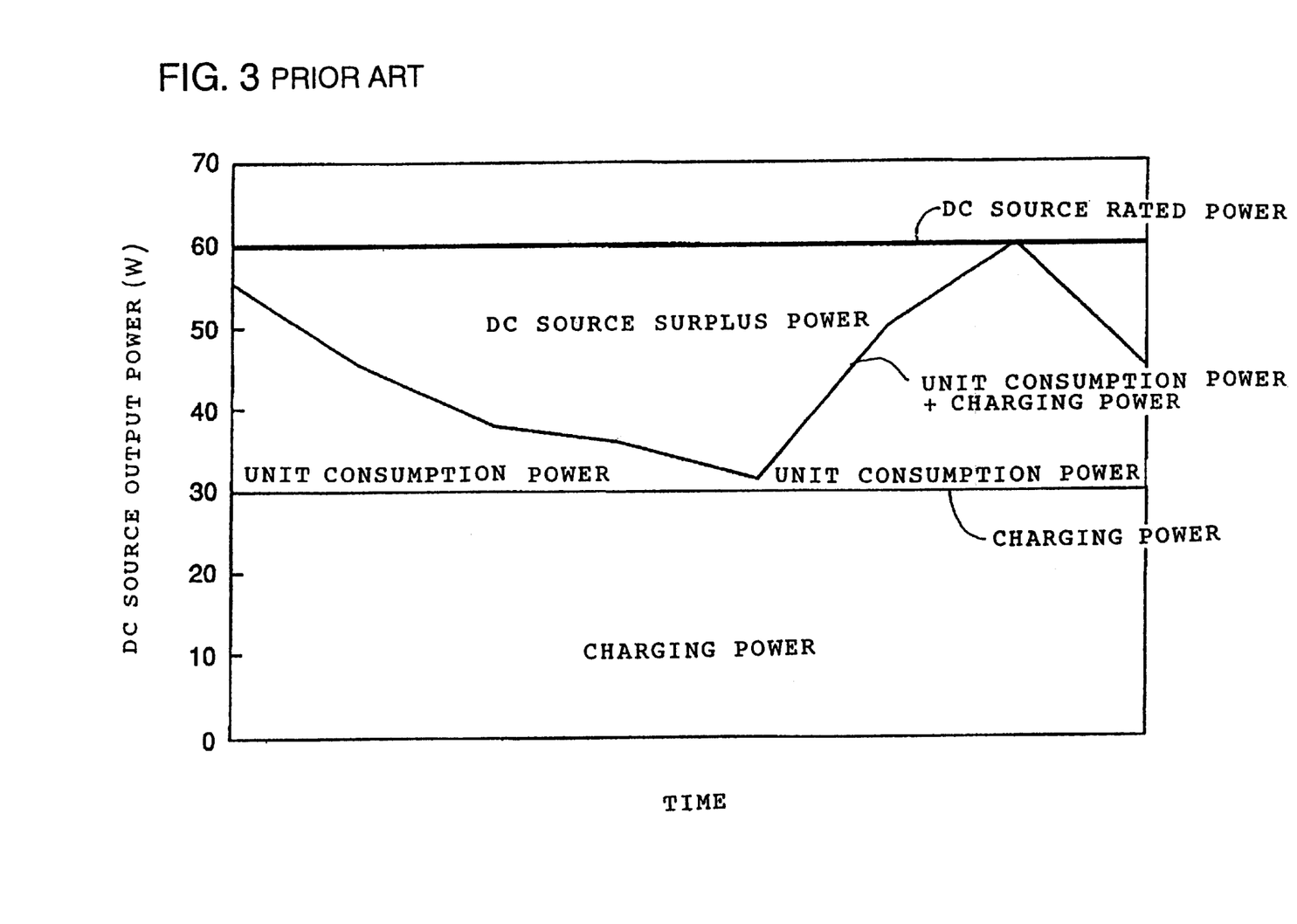
FIG. 3 is an operational conceptual diagram of the first technique of the conventional example.

Generally, a portable electronic device can be driven by application of power which is considerably lower than the maximum consumption power, and the time period while the device is required to be driven by application of the maximum consumption power is very short under normal operation. FIG. 3 shows the operational conceptual diagram. In FIG. 3, the maximum power required to drive the device is 30 W, and the maximum charging power is 30 W. Accordingly, the supply capability of the dc source is 60 W. However, since the power required to drive the device is changed with time, a large part of the power supply capability of the dc power source is surplus.

For this reason, regarding the above-described first technique of the conventional example, it is needed that the power supply capability of the dc source is designed so as to be surplus to a unit consumption power required under normal operation. Thus, there arises the problem that the shape and size and the cost of the dc source are increased.

Figure 4:
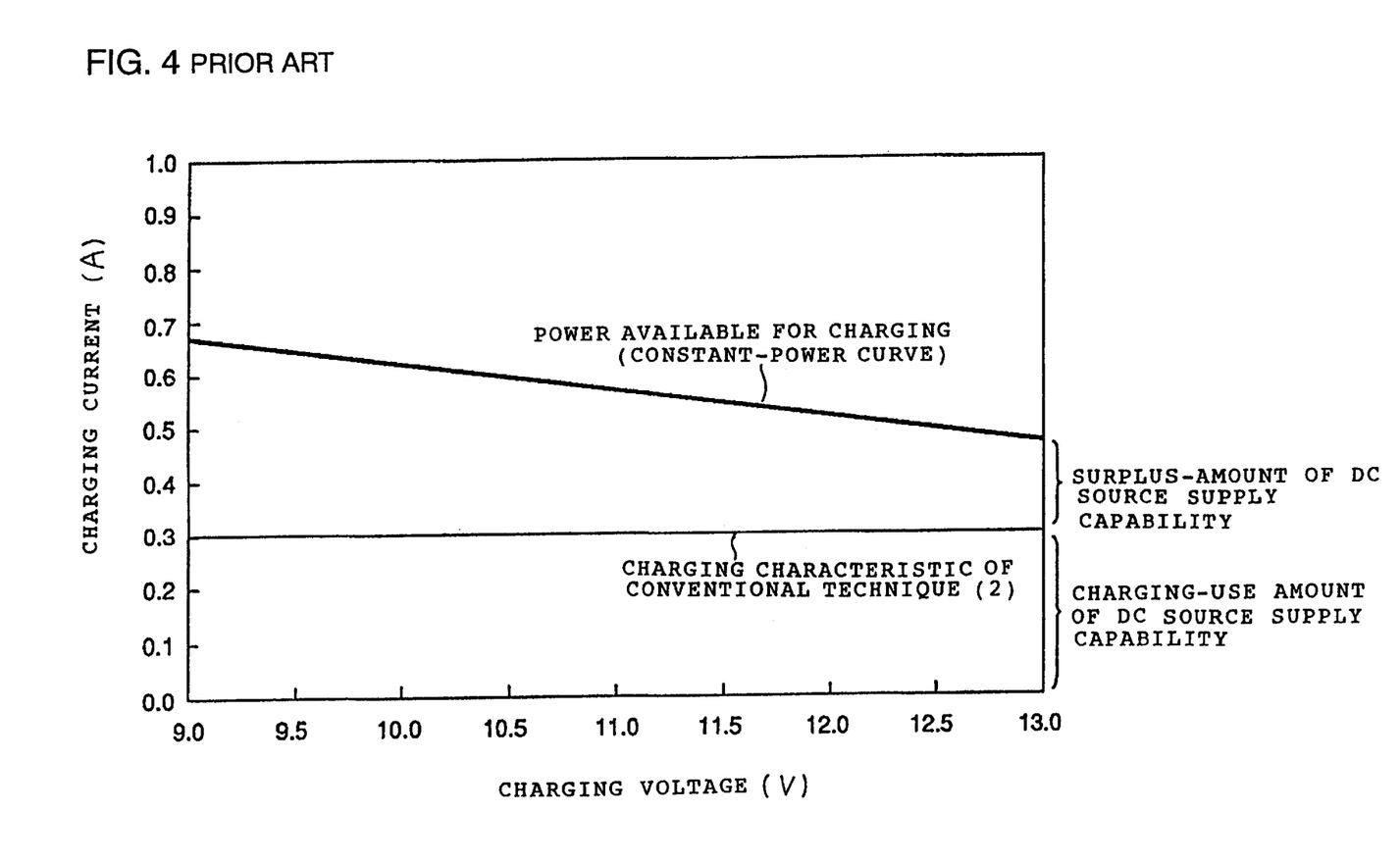
FIG. 4 is an operation conceptual diagram of the second technique of the conventional example.

In the above-described second technique of the conventional example, the charging output is controlled so that the rated current of the dc source is not exceeded. Therefore, the maximum supply power of the dc source can be reduced to the maximum consumption power of the unit. However, since the charging current is kept constant, irrespective of the charging voltage, the surplus power of the dc source can not be used effectively. FIG. 4 is the conceptual diagram.

Figure 5:
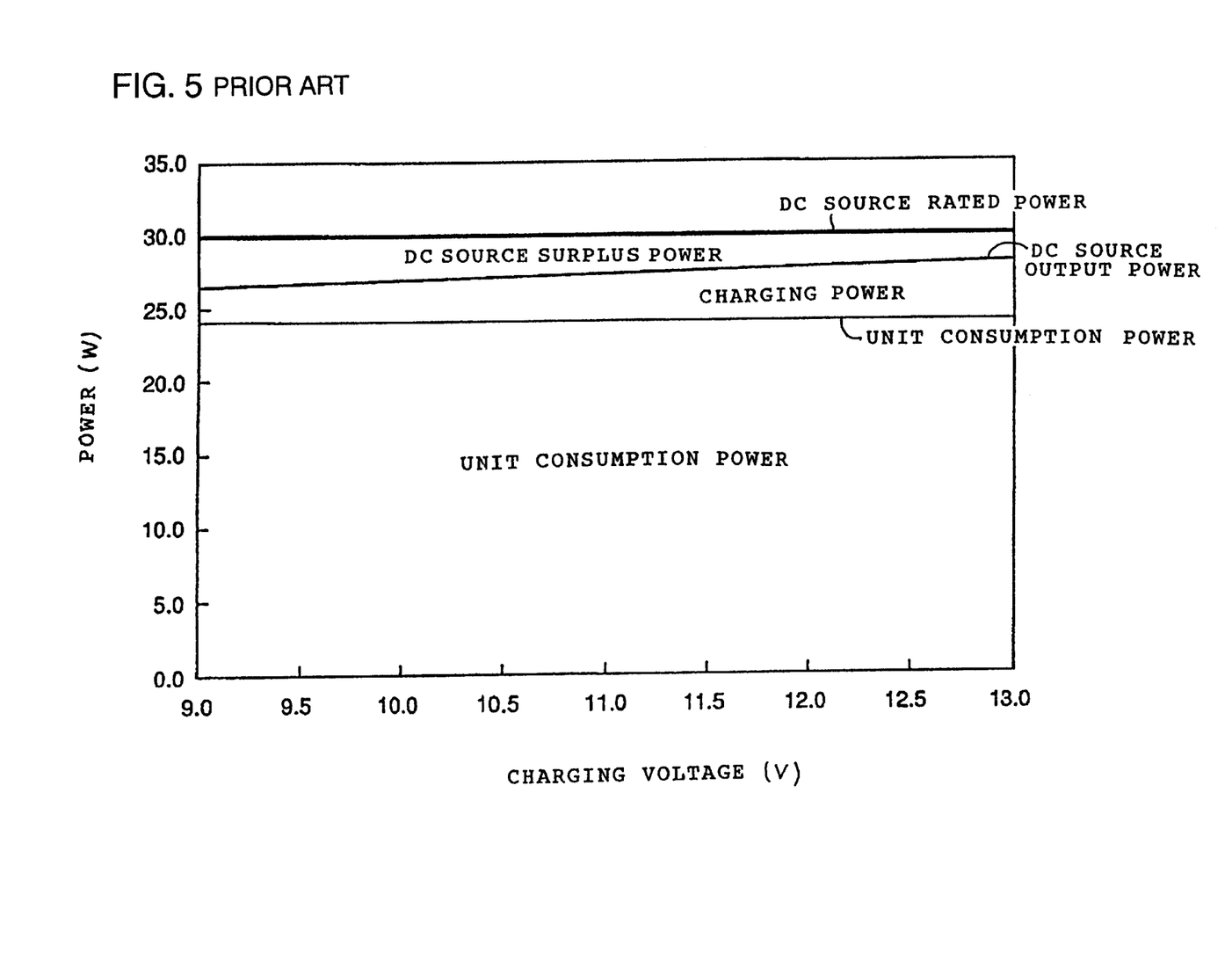
FIG. 5 illustrates a dc source surplus power generated in the second technique of the conventional example.

FIG. 4 illustrates the relation between the charging voltage and the charging current when the unit consumption power is not varied, obtained in the second technique of the conventional example. FIG. 5 illustrates the surplus power of the dc source, generated in the second technique of the conventional example. In FIG. 4, the rated power of the dc source is 60 W, the unit current draw is 2.0A, and the charging voltage range is 9.0–13.0V. In the second technique of the conventional example, the charging current is kept constant, irrespective of the charging voltage, as described above. On the other hand, the power (20×1.5–20×1.2=6 W) available for charging is constant, as shown in FIG. 5. Accordingly, if the charging is carried out in this technique, the surplus of the power supply capability of the dc source is increased when the charging voltage is low.

Accordingly, in the second technique of the conventional example, the power supply capability of the dc source can not effectively be used. Thus, there arises the problem that the charging time is increased, in spite of the power supply capability of the dc source.

Figure 6:
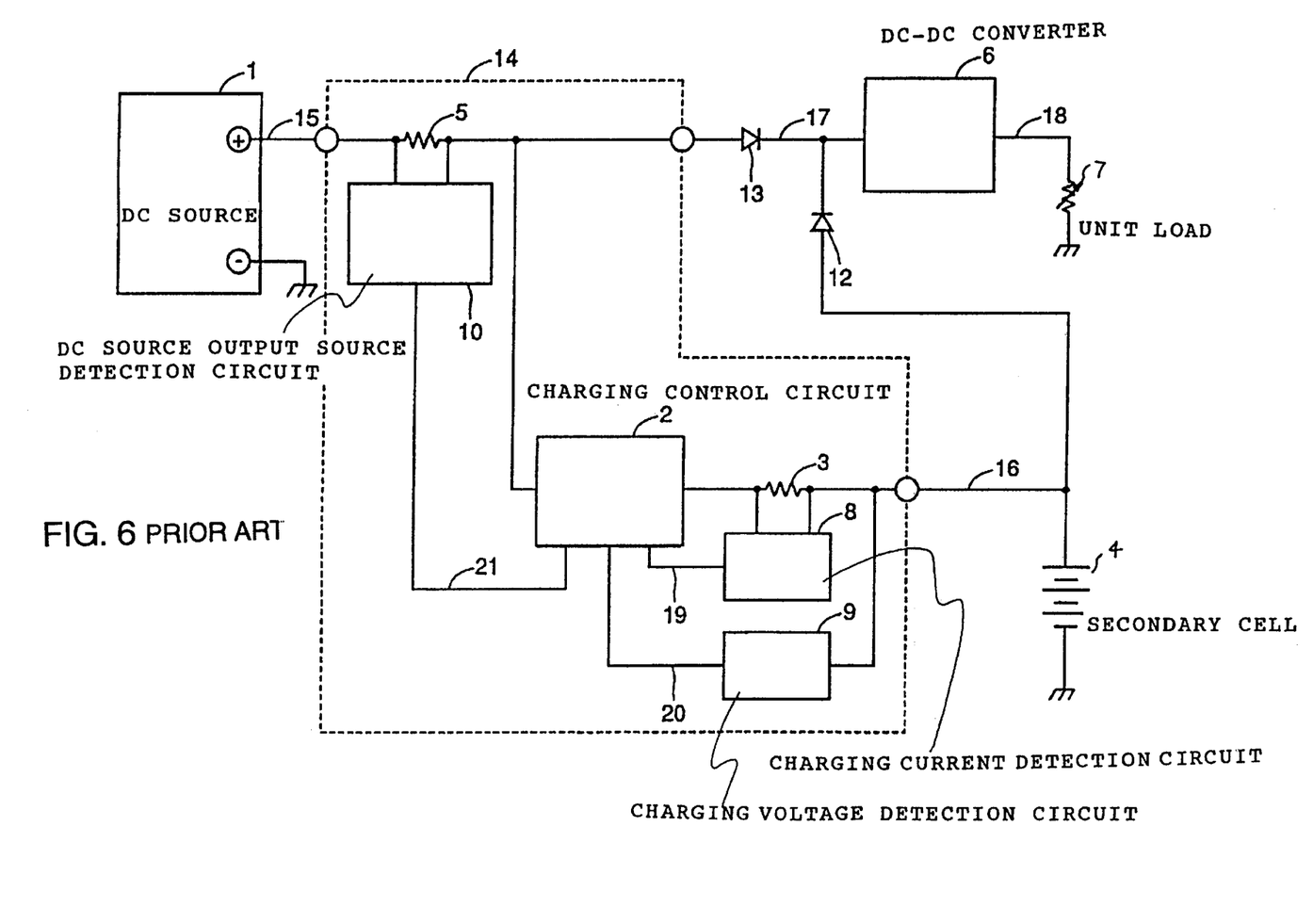
FIG. 6 is a circuit block diagram showing a charging controller in accordance with the third technique of the conventional example.

FIG. 6 is a block diagram of a charging controller which employs the above described third technique of the conventional example. In FIG. 6, an output 15 from a dc source 1 is provided to a charging control circuit 2 via a dc source output current detection resistor 5 of a charging circuit 14, and also provided to a DC-DC converter 6 via a rectification element 13. The input 17 of the DC-DC converter 6 is connected to the anode of a secondary battery 4 via a rectification element 12. The output 18 of the DC-DC converter 6 is connected to a unit load 7 of a portable device.

A voltage developed across the dc source output current detection resistor 5 is detected by a dc source output current detection circuit 10, and the detection signal 21 is provided to the charging control circuit 2 of the charging controller. The output of the charging control circuit 2 is connected to the anode of the secondary battery 4 via a charging current detection resistor 3. A voltage developed across the charging current detection resistor 3 is detected by a charging current detection circuit 8, and the detection signal 19 is provided to the charging control circuit 2. A charging voltage on the anode side of the secondary battery 4 is detected by a charging voltage detection circuit 9, and the detection signal 20 is also provided to the charging control circuit 2.

Next, the operation of the charging circuit 14 shown in FIG. 6 will be described. In the case of charging while the unit stops, a voltage developed across the charging current detection resistor 3 is detected by the charging current detection circuit 8. The charging voltage detection circuit 9 detects a charging voltage on the anode side of the secondary battery 4. An output 19 from the charging current detection circuit 8 and an output 20 from the charging voltage detection circuit 9 are fed back to the charging control circuit 2, whereby constant-voltage, constant-current charge is carried out.

When the unit is under operation, a voltage developed across the dc source output current detection resistor 5 is detected by a dc source output current detection circuit 10, and the detection output 21 is fed back to the charging control circuit 2, whereby the charging output is controlled so that the output current from the dc source 1 is prevented from exceeding a predetermined value.

With the charging controller shown in FIG. 6, the surplus power determined by subtracting a practical unit consumption power from the current supply capability of the dc source 1 can be utilized as charging output power, without any excess or shortage. Accordingly, the charging time of the secondary battery 4 can be reduced.

However, it is needed that all of the current required for driving the unit and charging is made to flow through the dc source output current detection resistor 5 for detecting the output current from the dc source 1. Therefore, a loss and heat generated in the dc source output current detection resistor 5 are increased, the reliability of the circuit is reduced, and the current detection accuracy deteriorates, caused by effects on the temperature characteristic of the dc source output current detection resistor 5. Moreover, it is needed to take measures for heat dissipation such as attachment of a radiation plate, which causes the problem that the shape and size, and the cost of the charging controller are increased.

SUMMARY OF THE INVENTION

The present invention can solve the aforementioned problem associated with the conventional art and provides a charging circuit which can reduce maximum charging power, charging time, and a loss generated in a current detection resistor.

The invention comprises a charging controller for charging a secondary battery from a dc source comprising a consumption current detector detecting a consumption current flowing in a load, a charging control circuit controlling charging of the secondary battery, a charging circuit input current detector detecting a current to be input to the charging control circuit, and an operation processor to which detection outputs from the consumption current detector and the charging circuit input current detector are provided, respectively, the charging control circuit controlling the charging output to the secondary battery, based on calculation results obtained by the operation processor so that driving the load and charging are simultaneously executed within the ratings of the dc source.

The operation processor may calculate an output current from the dc source, based on the sum of the detection output from the consumption current detector and the detection output from the charging circuit input current detector, and the charging control circuit controls the charging output to the secondary battery so that the output current from the dc source, calculated by the operation processor, is prevented from exceeding a predetermined value.

The operation processor may include an operational amplifier to calculate the output current from the dc source.

According to the present invention, the current flowing through the load and the current flowing through the charging controller are detected, based on the sum, the charging output to the secondary battery is controlled, whereby driving the load and charging are carried out simultaneously within the ratings of the dc source. Thereby, the loss in the current detection resistor can be suppressed, deterioration of the reliability of the circuit and the current detection accuracy, caused by effects on the temperature characteristic of the current detection resistor is eliminated, and no heat radiation dissipation measures such as attachment of a heat radiation plate or the like are needed. The size and shape and the cost of the charging controller can be reduced.

For the purpose of illustrating the invention, there is shown in the drawings several forms which are presently preferred, it being understood, however, that the invention is not limited to the precise arrangements and instrumentalities shown.

DETAILED DESCRIPTION OF EMBODIMENTS OF THE INVENTION

Hereinafter, the preferred embodiments of the present invention are explained in detail with reference to the drawings.

Figure 1:
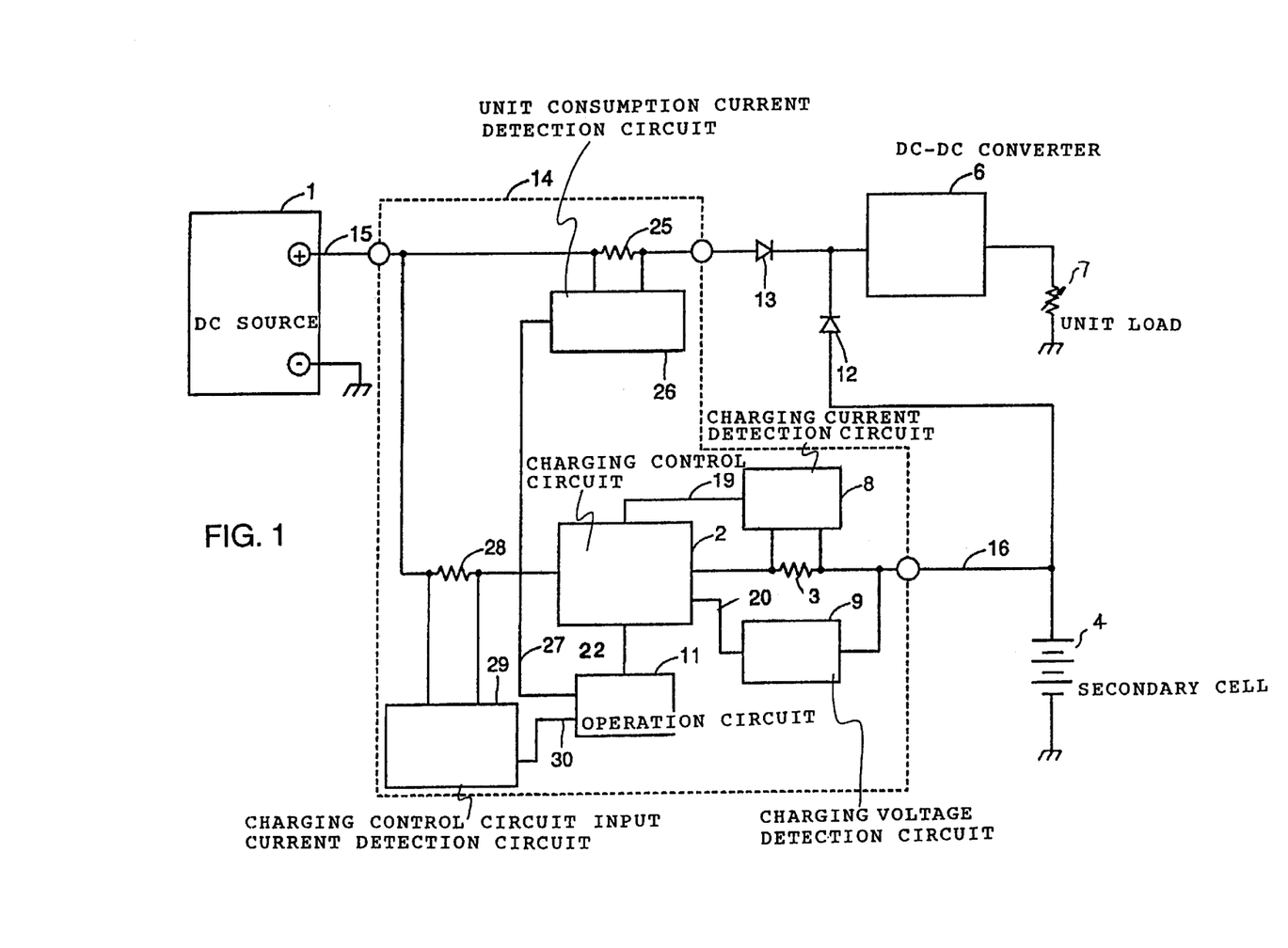
FIG. 1 is a circuit block diagram of a charging controller according to an embodiment of the present invention.

FIG. 1 is a circuit block diagram according to an embodiment of the present invention. In FIG. 1, parts which are configured differently from the configuration shown in FIG. 6 will be described. In this embodiment, a unit consumption current detection resistor 25 is provided instead of the dc source output current detection resistor 5 shown in FIG. 6, a unit consumption current detection circuit 26 is provided instead of the dc source output current detection circuit 10, and an operation circuit 11 and an input current detection circuit 29 of a charging control circuit controller are provided. To a charging control circuit 2, an output 15 from a dc source 1 is provided via a charging control circuit input current detection resistor 28. A voltage developed across the charging control circuit input current detection resistor 28 is detected by the charging control circuit input current detection circuit 29. A detection output 30 from the charging control circuit input current detection circuit 29 is provided to an operation circuit 11. In this embodiment, a detection output 27 from the unit consumption current detection circuit 16 is provided to the operation circuit 11, though in FIG. 6, the detection output 21 is provided to the charging control circuit 2.

The operation circuit 11 calculates the sum of the detection output 27 from the unit consumption current detection circuit 26 and the detection output 30 from the charging control circuit input current detection circuit 29, and provides its output to the charging control circuit 2. The charging control circuit 2 controls a charging output to a secondary battery 4, based on the calculation results obtained by the operation circuit 11.

Next, the operation of the charging controller shown in FIG. 1 will be described. The charging controller has a configuration in which the output 15 of the dc source 1 and the anode 16 of the secondary battery 4 are wired OR connected through rectification elements 13 and 12, respectively, and output power from the dc source 1 or the secondary battery 4 is converted to a voltage required for a unit load 7 of an electronic device by means of a DC-DC converter 6 for operation of the unit.

The dc source 1 has a function of stabilizing the output 15 at a predetermined voltage Vin to output. The rated output from the dc source 1 is represented by Pinmax. The charging control circuit 2 can control a charging current correspondingly to the output 22 from the operation circuit 11, the output 19 from the charging current detection circuit 8, and the output 20 from the charging voltage detection circuit 9.

In the charging current detection resistor 3, a voltage is developed, which is defined as $$Rc \cdot Ic \tag{1}$$

in which Rc represents the resistance of the charging current detection resistor 3, and Ic the charging current. The charging current detection circuit 8 detects the Rc·Ic, and inputs a value corresponding to the Rc·Ic to the charging control circuit 2. In the charging control circuit 2, feedback control is carried out correspondingly to an output from the charging current detection circuit 8 so that the charging current is prevented from exceeding a predetermined current. The charging voltage Vc is detected by a charging voltage detection circuit 9, and a value corresponding to the charging voltage Vc is provided to the charging control circuit 2. In the charging control circuit 2, feedback control is carried out correspondingly to the output 20 from the charging voltage detection circuit 9 so that the charging voltage is prevented from exceeding a predetermined voltage.

In the unit consumption current detection resistor 25, a voltage is developed, which is defined as Rs·Is in which Rs represents the resistance of the unit consumption current detection resistor 25, and Is the unit consumption current Is. The unit consumption current detection circuit 26 detects the Rs·Is, and an output 27 corresponding to the Rs·Is is input to the operation circuit 11.

In the charging control circuit input current detection resistor 28, a voltage is developed defined as $$Rp \cdot Ip$$

in which Rp represents the resistance of the charging control circuit input current detection resistor 28, and Ip the input current to the charging control circuit 2. The charging control circuit input current detection circuit 29 detects the Rp·Ip, and an output corresponding to the Rp·Ip is input to the operation circuit 11. As regards the output current Iin of the dc source 1, the following equation holds according to Kirchhoff's law.

$$Iin = Is + Ip \quad (2)$$

The Is changes successively with the operation conditions of the unit. The Ip can be changed by controlling the charging output in the charging control circuit 2. Accordingly, the output current Iin from the dc source 1 can be kept constant by controlling the charging current Ic correspondingly to the unit consumption current Is and controlling the input current to the charging control circuit 2. Accordingly, the output rated-current from the dc source 1 can be divided for the charging output and driving the electronic unit, without any surplus of the output rated-current, as seen in FIG. 2, by controlling so as to satisfy the following equation $$Iinmax = Is + Ip \quad (3)$$

in which the rated current Iinmax is substituted for the Iin of the equation (2), whatever value the Is may have (that is, whatever value the unit consumption current may have in the range of $$Iinmax > Is \quad (4).$$

The operation circuit 11 executes the calculation corresponding to equation (3). Accordingly, the charging current can be controlled so that the output rated-power of the dc source 1 is prevented from being surplus or short by feeding back to the charging control circuit 2 an output corresponding to a charging control circuit input current determined as a calculation result of equation (3).

Figure 2:
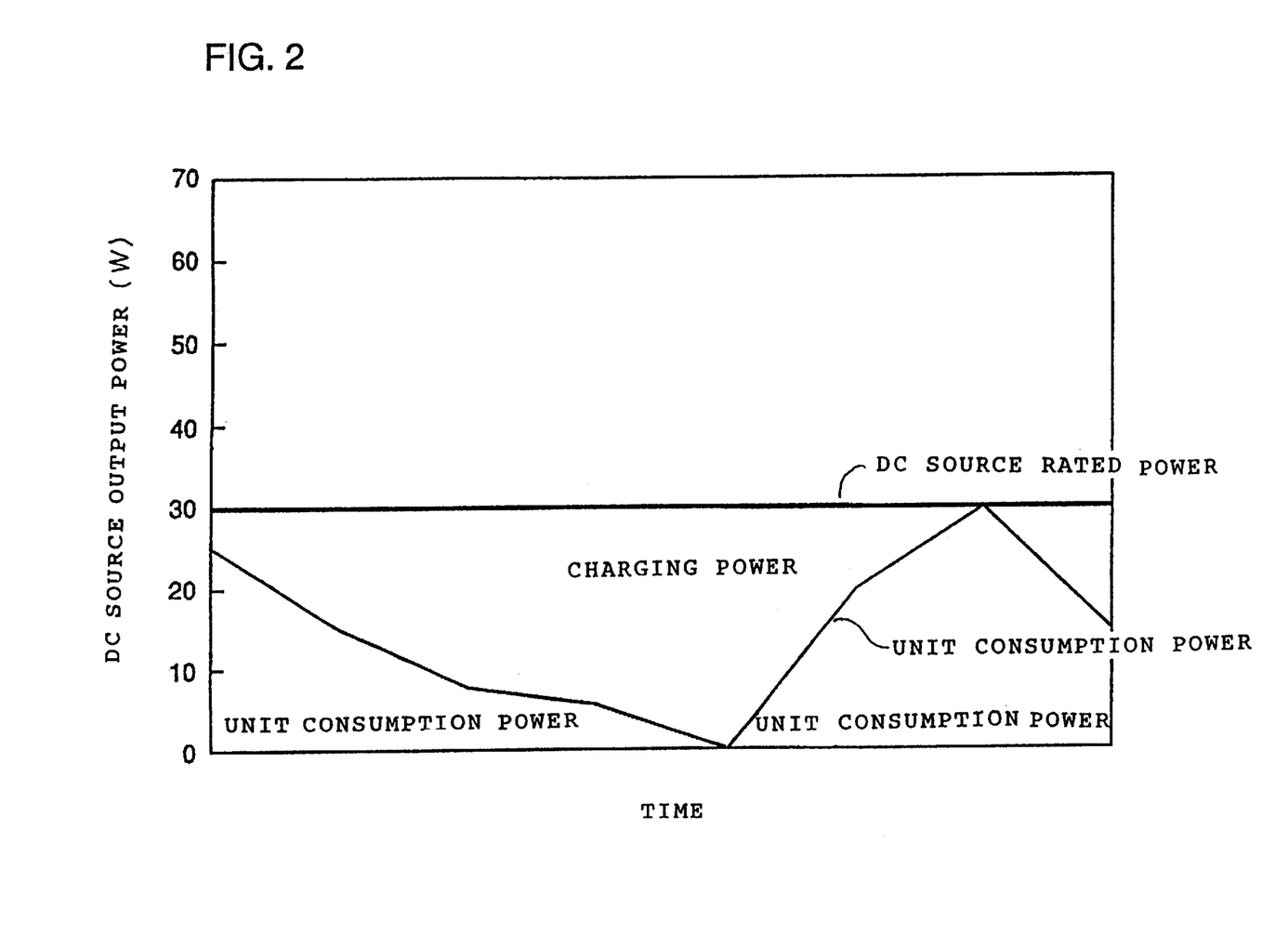
FIG. 2 is an operational conceptual diagram of the charging controller shown in FIG. 1.

FIG. 2 is an operational conceptual diagram of an embodiment of the present invention. As described above, charging and driving the unit can be simultaneously carried out by executing the calculation equivalent to the equation (3) in the operation circuit 11 for charging-control, on condition that the output rated-current of the dc source 1 is not less than the maximum consumption current of the unit, as seen in FIG. 2. Accordingly, in contrast to the method of designing so that the output power rating of the dc source 1 is not less than the sum of the maximum consumption power of the unit and maximum charging power, as stated in reference to the first technique of the conventional example, it become possible that the charging maximum power is reduced. Therefore, the shape and size, the weight, and the cost of the dc source 1 can be considerably reduced.

Further, according to the second technique of the conventional example, even when the charging voltage is low, the charging is carried out by application of the charging current of which the value is obtained by subtracting the unit consumption current from the output current from the dc source 1. On the other hand, in this embodiment, since the charging current can be changed by the charging voltage, a surplus current can be utilized as the charging output. Accordingly, as compared with the conventional second technique, the charging time of the secondary battery 4 can be reduced.

Further, the unit consumption current is small as compared with the output current from the dc source 1. Therefore, a loss generated in the current detection resistor can be reduced as compared with that generated in the conventional third technique in which the output current from the dc source is monitored.

Next, losses generated in the conventional example of FIG. 6 and the embodiment of FIG. 1 will be compared and described. Referring to FIG. 6, when the operation of an electronic device and charging are simultaneously carried out, a loss is generated in the unit consumption current detection resistor 5, caused by the flow of the maximum supply current Iinmax of the dc source 1, defined as $$Iinmax^2 \cdot Rin \quad (5)$$

in which Rin represents the resistance of the unit consumption current detection resistor 5. Hereupon, the loss defined by equation (5) is invariably constant, irrespective of the unit consumption current. Similarly, a loss is also generated, due to the current Ip flowing through the charging control circuit input current detection resistor 28 shown in FIG. 1, defined as $$Ip^2 \cdot Rp \quad (6)$$

Further, $$Iinmax \geq Is$$
$$Iinmax \geq Ip$$

hold invariably, and therefore, when the maximum values of voltage generated across the current detection resistor are the same, the following equations hold.

Accordingly, based on the equations (5) to (8), it is understood that the loss generated in the current detection resistor in the conventional third technique is larger than that in the embodiment of FIG. 1, as seen in the following equation.

$$Iinmax^2 \cdot Rin - Is^2 \cdot Rs - Ip^2 \cdot Rp$$
$$= (Is+Ip)^2 \cdot Rin - Is^2 \cdot Rin - Ip^2 \cdot Rin$$
$$= 2 \cdot Is \cdot Ip \cdot Rin$$
$$> 0$$

For example, when the average value of the unit consumption current is half of the maximum supply current of the dc source 1, the loss generated in the unit consumption current detection resistor 5 is half of that generated in the conventional third technique.

It should be understood that the embodiments disclosed here are illustrative and not restrictive. The scope of the present invention is defined by the appended claims rather than by the above description, and is intended to include meanings equivalent to the claims and all changes without departing from the claims.

What is claimed is:

1. A charging controller for charging a secondary battery from a dc source having an electrical rating, the charging controller comprising:

a consumption current detector detecting a consumption current flowing in a load;

a charging control circuit controlling charging of the secondary battery;

a charging circuit input current detector detecting a current to be input to the charging control circuit; and an operation processor to which detection outputs from the consumption current detector and the charging circuit input current detector are provided, respectively, said charging control circuit controlling the charging output to the secondary battery, based on calculation results obtained by the operation processor such that driving the load and charging are simultaneously executed within the ratings of the dc source.

2. The charging controller of claim 1, wherein the operation processor calculates an output current from the dc source, based on a sum of a detection output from the consumption current detector and a detection output from the charging circuit input current detector, said charging control circuit controls the charging output to the secondary battery so that the output current from the dc source, calculated by the operation processor, is prevented from exceeding a predetermined value.

3. The charging controller of claim 2, wherein the operation processor includes an operational amplifier to calculate the output current from the dc source.

4. The charging controller of claim 2, wherein the predetermined value comprises the consumption current plus a charging current to the secondary battery.

5. The charging controller of claim 1, wherein the consumption current detector includes a consumption current resistor.

6. The charging controller of claim 1, further comprising a charging current detector, the charging current detector providing an input to the charging control circuit.

7. The charging controller of claim 6, wherein the charging current detector includes a charging current detection resistor.

8. The charging controller of claim 1, wherein the charging circuit input current detector includes a charging circuit input current resistor.

* * * * *